United States Patent
Friel et al.

(10) Patent No.: US 9,462,338 B2
(45) Date of Patent: Oct. 4, 2016

(54) SET TOP BOX FOR PERFORMING DIAGNOSTIC FUNCTIONS

(75) Inventors: Liam Friel, Bray (IE); Derek Dwyer, Bray (IE); Colm Aengus Murphy, Dublin (IE); John Maguire, Dublin (IE); Duncan Palmer, Cork (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 13/821,973

(22) PCT Filed: Sep. 12, 2011

(86) PCT No.: PCT/EP2011/065792
§ 371 (c)(1),
(2), (4) Date: Mar. 22, 2013

(87) PCT Pub. No.: WO2012/032193
PCT Pub. Date: Mar. 15, 2012

(65) Prior Publication Data
US 2013/0185761 A1    Jul. 18, 2013

(30) Foreign Application Priority Data
Sep. 10, 2010 (GB) .................................. 1015121.5

(51) Int. Cl.
*H04N 17/00* (2006.01)
*H04N 21/4425* (2011.01)
(Continued)

(52) U.S. Cl.
CPC .......... *H04N 21/4425* (2013.01); *H04B 17/20* (2015.01); *H04H 60/32* (2013.01);
(Continued)

(58) Field of Classification Search
CPC ................... H04N 21/26291; H04N 21/4586; H04N 17/00; H04N 17/045; H04N 17/04; H04N 17/004; H04B 17/20
See application file for complete search history.

(56) References Cited

U.S. PATENT DOCUMENTS 7,571,253 B2 * 8/2009 Lee .................... H04N 21/2343
370/493
(Continued)

FOREIGN PATENT DOCUMENTS

| EP | 2 288 122 A1 | 2/2011 |
|---|---|---|
| JP | 01136291 | 5/1989 |

(Continued)

OTHER PUBLICATIONS

International Search report and Written Opinion corresponding to PCT/EP2011/065792, mailed Feb. 28, 2012, 17 pages.

*Primary Examiner* — Robert Hance
(74) *Attorney, Agent, or Firm* — Harrity & Harrity, LLP

(57) ABSTRACT

Examples of the disclosure enable a set top box to be installed. In some examples, a remote control device, a computing device, and a set top box are provided. The computing device downloads configuration information for a location and receives input from an installer at the location. The set top box includes a remote control interface that receives commands from the remote control device, a local communications channel that transmits data to the computing device, an emulator that emulates the receipt of the commands by injecting remote control keypresses into the remote control interface to issue the commands, and a diagnostic feature activatable over the local communications channel by the computing device after the computing device receives the input to perform verification tests and to return results of the verification tests to the computing device to confirm to the installer that the set top box has been installed correctly.

14 Claims, 10 Drawing Sheets

(51) Int. Cl.
*H04B 17/20* (2015.01)
*H04N 17/04* (2006.01)
*H04H 60/32* (2008.01)
*H04N 5/44* (2011.01)
*H04N 21/41* (2011.01)
*H04N 21/4363* (2011.01)

(52) U.S. Cl.
CPC ............... *H04N 5/44* (2013.01); *H04N 17/00* (2013.01); *H04N 17/004* (2013.01); *H04N 17/04* (2013.01); *H04N 17/045* (2013.01); *H04N 21/4126* (2013.01); *H04N 21/43637* (2013.01)

(56) References Cited

U.S. PATENT DOCUMENTS

| | | | |
|---|---|---|---|
| 2001/0011375 A1 | 8/2001 | Yun | |
| 2002/0161895 A1* | 10/2002 | Appiah | H04L 67/22 709/227 |
| 2003/0005447 A1* | 1/2003 | Rodriguez | H04N 7/17318 725/51 |
| 2003/0143946 A1* | 7/2003 | Grzeczkowski | H04N 7/17309 455/3.05 |
| 2004/0093370 A1* | 5/2004 | Blair | H04N 7/173 709/200 |
| 2006/0026481 A1* | 2/2006 | Monnerat | G01R 31/2825 714/741 |
| 2007/0064714 A1* | 3/2007 | Bi | H04L 41/0631 370/401 |
| 2008/0143517 A1 | 6/2008 | Goffin | |
| 2008/0166105 A1* | 7/2008 | Vanderhoff | G08C 23/04 386/291 |
| 2009/0064251 A1 | 3/2009 | Savoor | |
| 2009/0217335 A1 | 8/2009 | Wong et al. | |
| 2009/0282455 A1* | 11/2009 | Bell | H04N 17/04 725/151 |
| 2011/0187491 A1 | 8/2011 | Innes | |
| 2012/0023402 A1* | 1/2012 | Cifra | G06F 3/0481 715/704 |

FOREIGN PATENT DOCUMENTS

| | | |
|---|---|---|
| JP | 10304404 | 11/1998 |
| JP | 2005196433 A | 7/2005 |
| JP | 2008079331 | 4/2008 |
| JP | 2009218910 | 9/2009 |
| WO | 02076100 | 9/2002 |
| WO | 2007107863 | 9/2007 |

* cited by examiner

SET TOP BOX FOR PERFORMING DIAGNOSTIC FUNCTIONS

FIELD OF THE APPLICATION

The present application relates to set top boxes

BACKGROUND OF THE APPLICATION

A set top box (STB) or set-top unit (STU) is a device that connects an external source of signal to a television or other display device, turning the signal into content which is then displayed on the television screen. The signal source may come from a satellite dish, a coaxial cable (cable television), Internet Protocol Television (IPTV), such as over fibre, DSL phone or Ethernet, or a UIHF\VHF antenna.

Whilst set-top boxes may traditionally have been mere decoder devices, modern set-top boxes offer more advanced features including, for example, interactive television and the ability to record programmes.

With the increasing complexity and ubiquity of digital Set Top Boxes, the problem of maintaining them in fully working order with satisfied subscribers is becoming increasingly costly. Currently, diagnostic facilities can be included within the set-top boxes, however, this facility tends to be limited and may be of limited use in determining the problems on a set-top box as might be perceived by a user. The present application is directed at providing solutions that improves upon prior art approaches.

SUMMARY

The present application solves this problem by including an ability within a multimedia device, which may for example, be a set top box for a user to send instructions to the set top box as if they were using the remote control of the set top box. In addition to or in place of this function, the set top box also may provide the ability to send copies of what is being displayed by the set top box to a user remote from the set top box. Thus, a technician can effectively interface with the set top box as if he was present in the end user's home watching the output from the set top box on a connected television and similarly he can send remote control key presses as if he was using the user's remote control. A diagnostic function may be included within the set top box. The diagnostic function suitably runs in the background on the set top box but may be remotely activatable or responsive to changes in state on the set top box, including for example the detection of a fault.

The present application provides a set-top box and system in accordance with the claims which follow. Advantageous embodiments and features are set forth in dependent claims.

In one embodiment, a set top box is provided for decoding received media content in a signal and providing this media content to a television, the set top box comprising: a) a communications channel for receiving instructions and transmitting data to an external device, and b) a diagnostic feature activatable by the external device over the communications channel and which when activated causes the set top box to perform one or more tests on the set top box and return the results to the external device.

The communications channel may be a local wireless connection. The external device may be a handheld computing device. The wireless connection may be a Wi-Fi connection to a local gateway to the internet and the external device is a server connected the internet in a remote location.

The external device may be configured to allow a user through a graphical interface to transmit instructions to the set top box.

In another embodiment, a set top box is provided for decoding received media content and providing this media content to a television set, the set top box having a control interface for receiving commands from a local user to perform functions on the set top box, a communications module for receiving instructions from a remote user over a communications channel, an emulator for emulating the receipt of at least one command at the remote control interface in response to the receipt of an instruction from a remote user by the communications module to issue the at least one command. The control interface may be a remote control interface. The control interface may comprise an infra red detector. The set top box may further comprise: a) a video module in which received media content is formatted into the video component of a TV signal, and b) an image capturing block for capturing at least one image from the video circuit and transmitting this captured image to the remote user through the communications module. The image capturing block may be configured to compress the image into in a compressed format before transmission. The video module may be adapted to provide On Screen Display (OSD) information within the video component. The video module may be configured to retrieve the OSD information from an OSD memory. Suitably, the image captured by the image capturing block comprises OSD information retrieved from the OSD memory. The image captured may be exclusively OSD information retrieved from the OSD memory.

The communications module may be configured to obtain a measure of speed and\or bandwidth of the communications channel and wherein the degree of compression performed by the image capturing block is responsive to the obtained measure.

The instruction received from the remote user may comprise a series of commands to be issued to the set top box through the emulator and wherein the emulator issues the commands to the remote control interface with a delay between commands to allow the set top box to perform the command. The image capturing block may be triggered after the execution of the last command in the series.

The set top box may comprise a diagnostic function, which may be remotely activated by the remote user by an instruction sent over the communications channel and which when activated performs one or more diagnostic tests upon the set top box. The results of the one or more diagnostic tests may be provided to the user by the diagnostic function through the communications module. The communications module may initially be disabled to act upon instructions from a remote user over the communications channel. In which case, the communication module may be enabled to act upon instructions from a remote user by the issuing of at least one command by a local user at the control interface. This enabling may comprise the communications module establishing a session with a remote server.

In another embodiment, a set top box is provided having a power measurement component, the power measurement component comprises at least one timer for measuring the aggregate duration a set top box is in an individual state. Suitably, there may be a plurality of timers, each timer recording the aggregate duration the set top box is in an associated state. The associated state may be one or more of a) the STB, b) a hard drive, c) a tuner, and d) an AV output. The set top box may be configured to report the durations of the at least one state to a remote server. The set top box may be configured to perform a power consumption calculation from the timed durations.

The set top box may be suitably configured to upload the result of the power consumption calculation to a remote server.

A further embodiment provides a method of measuring the power consumption of a set top box, the method comprising the step of measuring the duration of different states of the set top box, retrieving a measure of power usage in each of the different states; and using the measured durations and power usage measure for each state to obtain a power consumption for that state and aggregating the power consumption for the different states to provide a total measure.

A further embodiment provides a set top box comprising: a) an internal monitoring component for monitoring the state of one or more of the hardware\software components within the set top box, b) a communications component for sending data to a remote computing system, wherein the internal monitoring component is responsive to a detection of a change of state in the one or the hardware\software components to cause the communications component to send a notification of said change in state to the remote computing system. The change of state may be one that is indicative of a fault.

The one or more hardware\software components may include one or more of the following: a) a hard drive, b) a tuner, c) an AV output, d) Conditional Access card, e) a network interface, f) a modem, and g) an externally connected device connected to a Universal Serial Bus (USB) or High Definition Multimedia Interface (HDMI) of the set top box. The internal monitoring component may be a middleware application component. The status updates may be received from other middleware components. The change in state may be one of 'booting' the set top box. The change in state may be one of a timer.

The application also extends to one or more of:
a) a set top box;
b) a computing system configured for receiving diagnostic data from a set top box and storing the received diagnostic data in a database substantially as described herein with reference to and/or as illustrated in the accompanying drawings;
c) a hand held computing device for use in the servicing\installation of set top boxes;
d) a diagnostic software component for a set top box;
e) a method of operating a set top box;
all substantially as described herein with reference to and/or as illustrated in the accompanying drawings.

DESCRIPTION OF DRAWINGS

The present application will now be described with reference to an exemplary implementation and the accompanying drawings in which.

DETAILED DESCRIPTION

As discussed above, set-top box service operators are looking for ways to ensure that these complex devices fail less often. For those subscribers who do experience problems, operators are looking for ways to improve the chances that a remote customer support representative (CSR) may be able to help them and resolve a customer's problem over, for example, the telephone. And in those cases where further field support is required, operators are trying to improve the capabilities of the field engineering team to resolve the issue without switching out the Set Top Box (STB) and replacing it with another unit. Finally for those units which do return to the Operator or their manufacturers for repair, they are looking to improve the screen, clean and repair process to minimise the time spent in repair and improve the reliability of screening decisions made.

The present application is directed to assisting with some or all of these aspects of an operator's STB supply chain operation and will now be explained with reference to the architecture of an STB. One significant factor is that the present application does not require a change to the hardware of most STBs merely an upgrade to its software.

Figure 1:
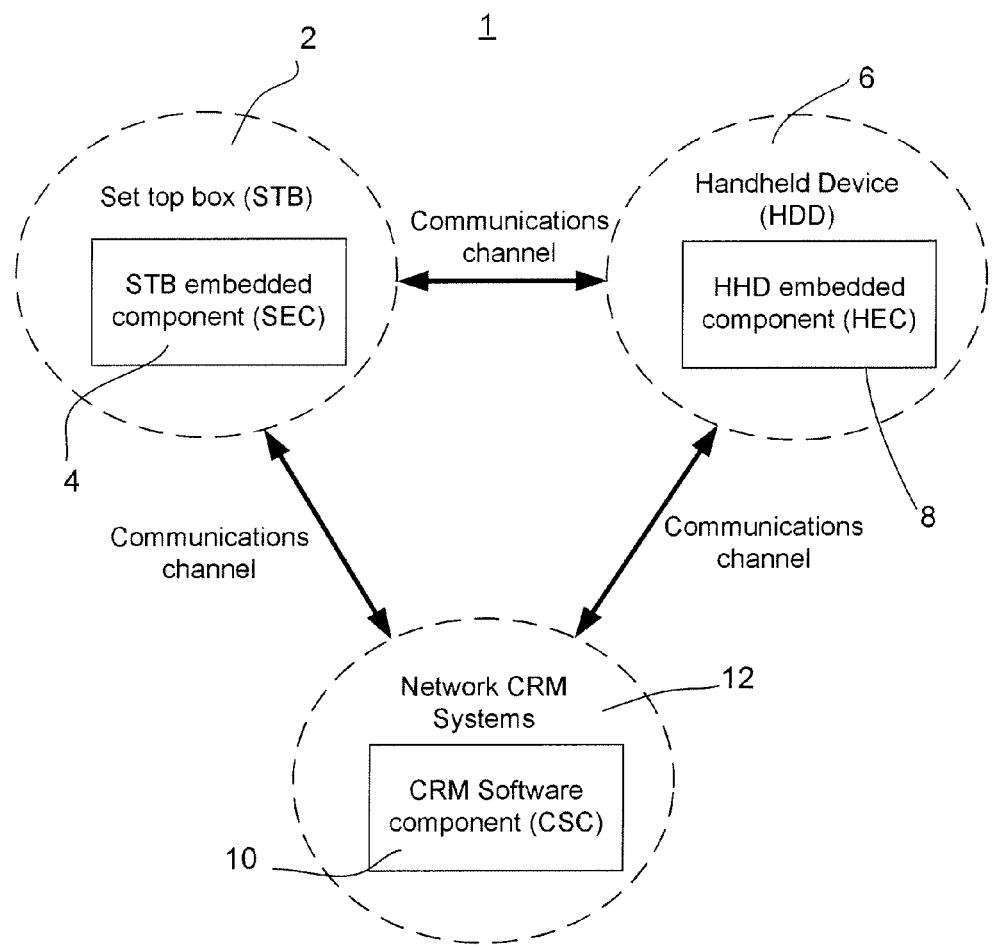
FIG. 1 illustrates the components of a system provided by the present application.
Figure 2:
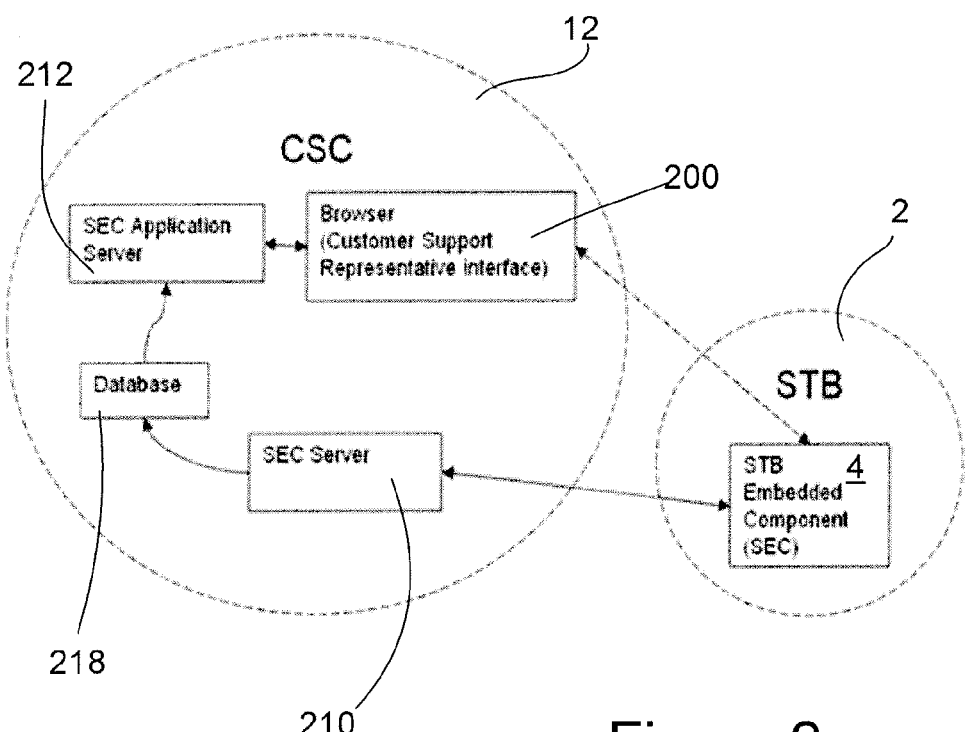
FIG. 2 illustrates the interactions between a customer support function and a customer using aspects of the system of FIG. 1.

The present application, as illustrated in FIGS. 1 and 2, comprises a software component 4 resident on a set-top box 2 (SEC—Set top box Embedded component). A software component resident on an external device\system, for example which may be a field engineer's hand held device 6 (HSC—Handheld Software Component 8) or the operator's Customer Relation Management (CRM) system 12 (CSC—CRM Software Component 10) interacts with the software component on the set top box.

Figure 3:
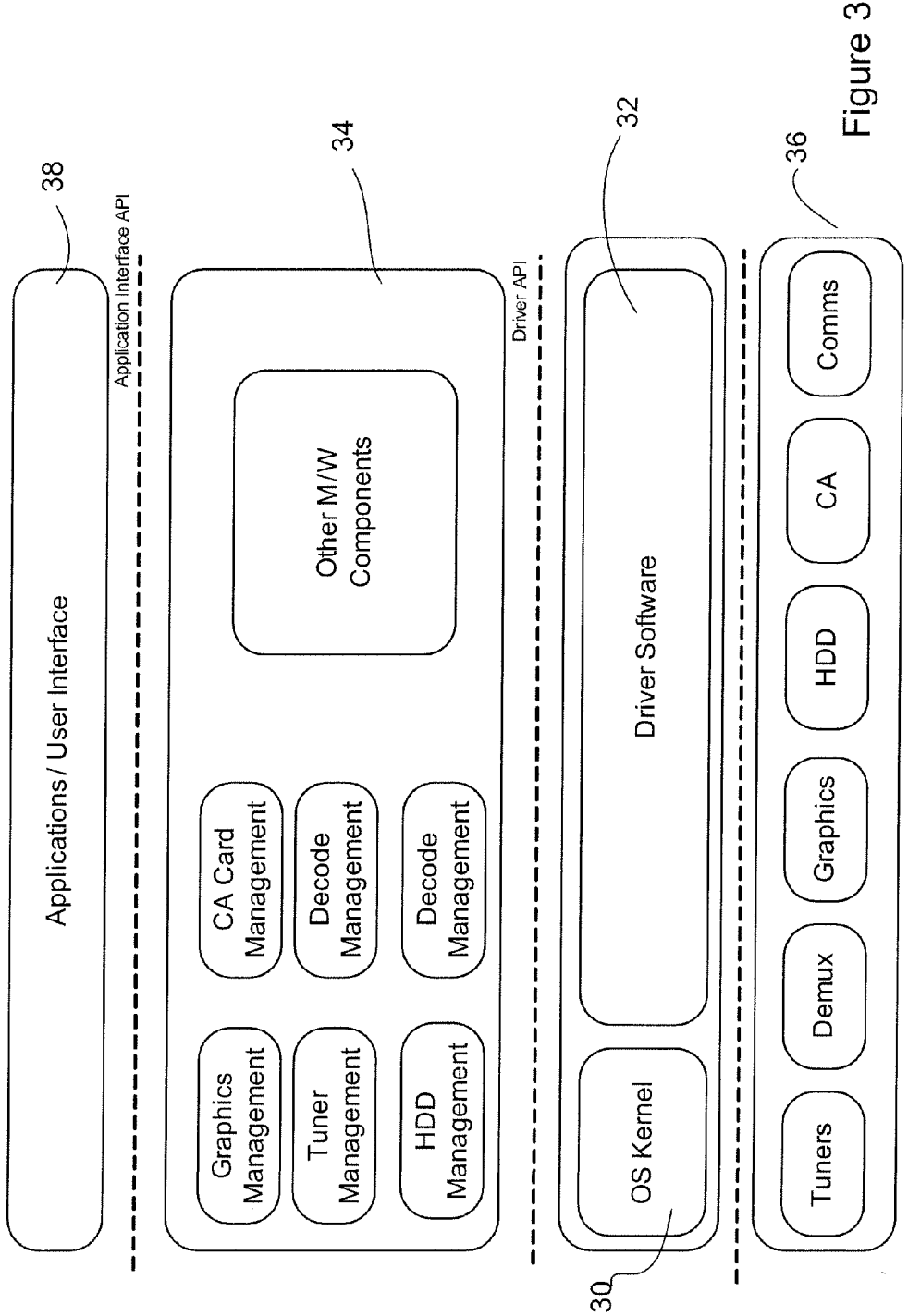
FIG. 3 illustrates the configuration of a set top box suitable for implementing an aspect of FIG. 1.

A typical STB architecture, as illustrated in FIG. 3, comprises hardware which is managed by a software stack. This STB software stack (or firmware) is resident on the box.

The STB Software stack consists of an Operating System 30, Drivers 32, Middleware 34, and Application layers 38. Drivers implement and are responsible for low level hardware interfacing 36 for example with the tuner circuitry, demux logic, graphics, hard disk drives, CA (Conditional Access Card), and communications.

Middleware implements complex functionality on top of the driver layer, such as displaying video on channel 111 and abstracts the complexity of different hardware from the applications layer. The user interface, which can be presented as an OSD on the television is implemented in the Application layer. This software stack including Middleware and Application is referred to generally as the Main System Image.

The present application arises from the incorporation, for example, of a software feature, suitably in the form of additional software incorporated into the firmware resident on the Set Top Box in the user's home. This piece of software may operate in different modes depending on the functions to be performed, the way it the software is triggered and the way the software is being accessed.

Figure 4:
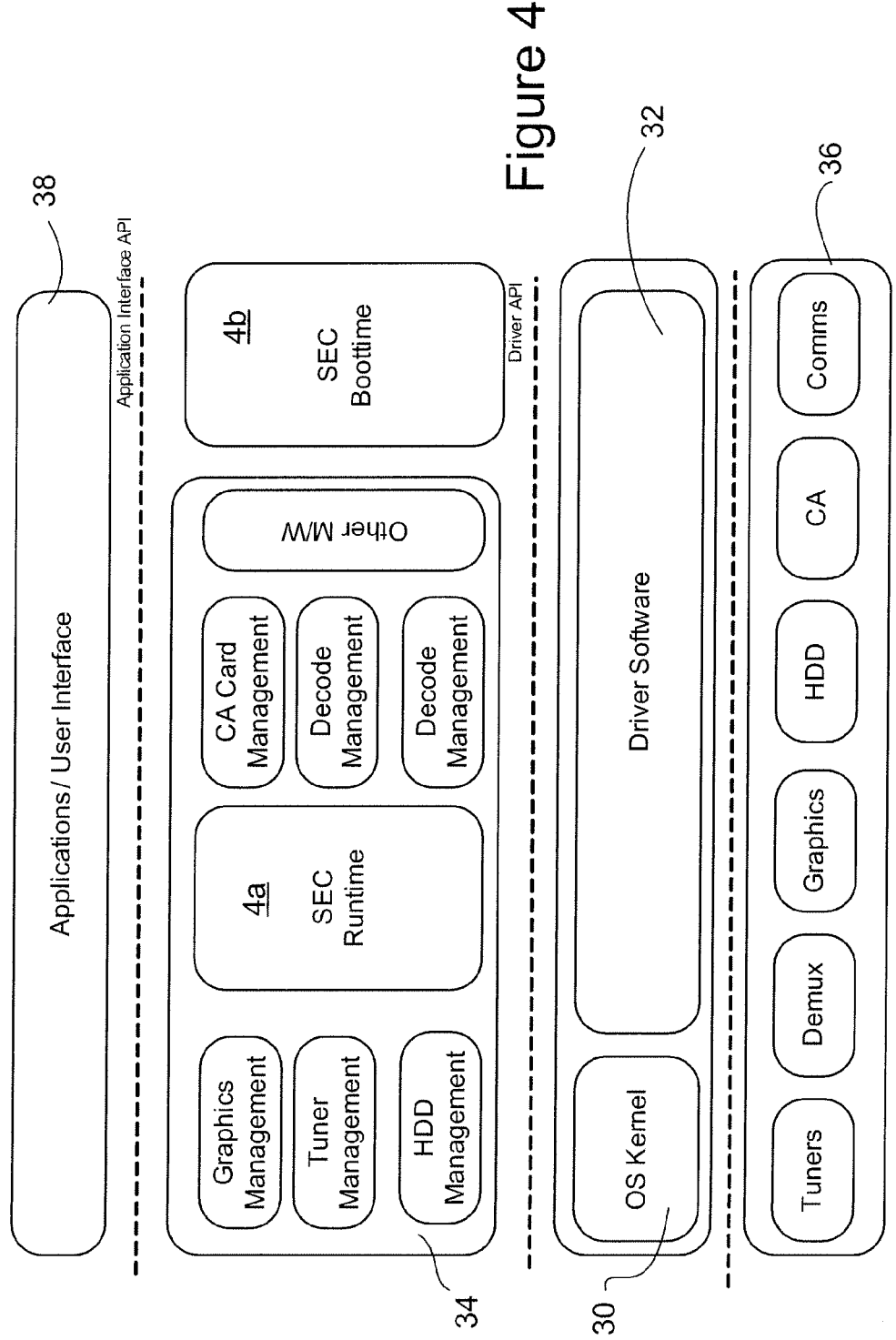
FIG. 4 illustrates an arrangement of FIG. 3 adapted for implementing an aspect of FIG. 1.

The software may be integrated into the STB, for example, as illustrated in FIG. 4, in which this additional software referred to herein generally as the SEC or STB Embedded Component. As further detailed below, the SEC software has two primary components, SEC Boottime 4b and SEC Runtime 4a, which are suitably middleware components.

When the STB is powered on, the Operating System is started. The Operating System initializes the drivers and is then configured to start the SEC Boot Time Component. The SEC Boot Time component may decide to run low-level hardware diagnostics as described further below. If the SEC Boot Time Component exits, the Operating System will proceed to start the Middleware. The Middleware, though an internal initialization process, initializes all of its components, followed by the Application (user interface).

The SEC Runtime is a middleware component, and is started with other middleware as part of the normal boot process. The SEC Runtime may be regarded as an internal monitoring component.

The middleware contains software components responsible for managing individual hardware components. These middleware components provide a variety of status information about the hardware they manage. This status information identifies whether or not a hardware component has failed.

The Run Time Component of the SEC is configured to perform a plurality of tasks, which may include but is not limited to some or all of the following:

Maintain a 'data model', which contains the status of Hardware components of interest. This data model is suitably built by querying other middleware components (e.g. Tuner Management) to retrieve hardware status. The run time component registers with the other middleware components to receive notifications of any change in hardware status.

Use facilities provided by other middleware components to implement diagnostics, for example by injecting simulated remote keypresses and retrieving configuration settings used by the application component.

Implement communications through a communications module\circuit in the STB with the HSC and CSC. Communications may be initiated in response to a variety of criteria including the presence of hardware errors in the data model, a request by the user of the STB via a handheld remote control or to a request received over a TCP/IP network connection from the HSC.

SEC Runtime Diagnostics and Status:

The SEC is initialised during the Middleware startup process. When initialised, the SEC queries other Middleware components to retrieve the status of hardware components in which the SEC is interested.

During operation of the Set Top Box, hardware failures are identified by others middleware components, which then notify the SEC via a callback mechanism. The SEC is notified of hardware status changes, such as a tuner tuning to a new transponder, in the same manner.

SEC Runtime Remote Control:

The SEC is suitably configured to be activatable to respond to commands received from the HSC or CSC, to inject remote control keypresses, and retrieve On Screen Display (OSD) snapshots.

SEC Runtime Keypress Injection:

To simulate remote control keypresses, the SEC may call on an API provided by the Middleware component responsible for managing the remote control hardware. This component then passes the keypresses on to other Middleware components and the Application as if they had been received from the normal infra red remote control used by set top box users.

SEC Runtime OSD Snapshot Retrieval:

The Middleware's graphics management component maintains a 'graphics surface' (which for ease of understanding may be thought of as a frame buffer containing the pixel data which will be displayed on the OSD) which contains the contents of the OSD and which is combined with or replaces media content being converted into video by the video circuitry of the STB for display on a connected television.

Suitably, the SEC maintains its own graphics surface, with a resolution smaller than or equal to the surface which contains the contents of the OSD.

To retrieve an OSD snapshot, an image capturing block within the SEC copies the contents of the OSD graphics surface to its own graphics surface. The contents may be resized according to parameters provided by the HSC/CSC. The SEC may then compress the contents of the OSD surface using a suitable compression algorithm, e.g. JPEG compression. The resulting compressed image is sent to the requesting CSC/HSC.

SEC Communications:

The SEC has a concept of a communication 'session'. This session may be initiated in response to a variety of criteria, as previously described. During a communications session, a HSC or CSC may send requests to the SEC to retrieve the data model, or initiate diagnostics.

When communicating with a HSC, the HSC is responsible for establishing the connection to the SEC. for example by connecting to a predefined port number on the STB using TCP/IP. The HSC is configured with the address of the STB by its operator before they attempts to establish the connection. The SEC then communicates with the HSC over this connection, until the HSC closes the connection. When communicating with a CSC, the SEC is responsible for establishing the connection to the CSC, for example by connecting to a predefined port number on the CSC using TCP/IP. The SEC is configured with the address of the CSC before it is installed onto the STB. Once the connection to the CSC is established, the SEC communicates with the CSC over this connection until the CSC closes the connection.

Using this configuration, the Set-top box resident software component (SEC) may be configured to interact with features of the set-top box to perform one or more of the following functions:

1. Communicate with the hand-held resident software component over an appropriate communication channel, such as Ethernet, serial port, Bluetooth etc.
2. Simulate the operation of a human operator of the set-top box by simulating the injection of Infra Red commands into the STB.
3. Detect if a video and audio services are playing on the STB
4. Detect the signal strength and quality parameters of the STB front-end if and when tuned
5. Access low level software in the set-top box in order to access and determine state of hardware devices
6. Access hardware components in the STB
7. Access hardware components connected to the STh via external interfaces such as for example but not limited to FIDMI, USB, smartcard slot etc.
8. Retrieve the contents of the On Screen Display (OSD). In cases where a low bandwidth network is deployed and hence live streaming of the OSD to the CSC is not practical this can be achieved by taking one or more snapshots of the OSD and subsequently uploading to the CSC at a rate compatible with the bandwidth of the network connection.

9. Record content audio\images being provided by a video circuit of the STB

The hand-held software component (HSC) is software which may be installed on a field engineer's hand held computing device. These are typically general purpose computing devices running a standard computing operating system such as Microsoft CE.

This hand-held computing device will allow different applications to be run, similar to a smartphone or PDA.

The installer uses his hand-held computer to manage his diary, retrieve his list of customer visits for the day and storing information about each customer. The hand-held computing device will provide a graphical user interface to the engineer, and may have integrated the typical communication channels expected from such a tool, for example GSM, Bluetooth, Wifi and RS-232 capability.

The HSC is implemented as an application on the hand-held computing device and can control the computing resources of the hand-held device.

The hand-held software when installed on a hand held computing device may allow the hand held device to perform one or more of the following:
1. Communicate with the set-top box resident software component over an appropriate communication channel such as Ethernet, serial port, Bluetooth etc.
2. Communicate with the CRM system of the network operator e.g. when connected to the internet.
3. Display results received from the STB component (SEC)
4. Send reports back to the central CRM system indicating the installation completion status.
5. Using an in-built or attached GPS receiver to determine the current (or where not available) the most recently measured position from the receiver. This position may be used to infer what signal strength should be seen by the STB at that point in the network. This may be compared with a measured signal strength received from the STB to ensure it is working correctly. The resulting information including the location of the STB may be sent back to the central CRM.

The final component is a network Customer Relationship Management (CRM) component (CSC). This may be operating on the server(s) of the operator, and may for example be used by telephone services representatives in a call centre environment. The CSC may include a database for storing customer information, including information on their STBs, a user interface, for example, a suitable client application with a graphical user interface, allowing a user within the operator to access and review data on the database and a network interface allowing a user through the user interface to send instructions to and receive data back from an STB.

The CSC may also receive and send data to the HSC. It may be appreciated that existing HSC and CRM functionality provides for interchange between the HSC and CRM, although to date this has conventionally been for downloading work orders and confirming completion as items on the work order are completed. The communication between the HSC and the CSC may be over a communication channel for example an IP channel, which may for example be provided from the handheld device through a mobile telephone wireless network to the Internet and from there to the server hosting the CRM software of the operator. The CSC may help a field engineer\repair technician in their diagnosis of faults from status data provided by the STB either directly or through the handheld device as an intermediary. Thus using status data, the CSC may provide information and knowledge of fault indicators, which can be simple. For example, software version X exhibits failure Y, or drive model X is likely to fail after Y operating hours.

Pictorially the interaction between the three components may be represented as in FIG. 1. The advantages and other features of the individual components and the overall system will now become apparent from some exemplary situations in which the above described elements may be employed.

Field Engineers Diagnostics Use Case

A significant proportion of Set top Boxes are found to be fully functional and in no way faulty, commonly called No Fault Found or NFF, when they are returned by field engineers to screening and repair facilities. It may be appreciated that such correctly functioning boxes should in most cases have been identified as fully functioning in the user's home and not removed. Removal of a set top box inconveniences customers, adds to inventory costs during the box's time in transit through the repair cycle, and results in additional capital expenditure for the operator if they are required to provide the subscriber with a replacement receiver.

Using the previously described components a field engineer is able to run detailed diagnostics on the STB using the HSC when is in the subscriber's home. This allows for a complete assessment of the receiver hardware while connected to the network infrastructure at the customer's premises and in the customer's environment.

Once a field engineer arrives at a customer's site, he may typically perform a quick physical inspection to ensure that the STB is powered on, is connected to the network and is connected to the TV. Once the field engineer has completed the physical inspection procedure, he activates the HSC software, for example as shown in the process flow of FIG. 5A, within his hand-held device, for example by selecting an option on a menu of the graphical user interface of the hand held device.

The HSC software component using a communications channel common between the STB and the hand held device, attempts to establish communication 50 with the STB. A first step in the process may comprise a selection 52 of the appropriate communications channel. Upon detecting 54 the communication attempt, the Embedded Component (SEC) within the STB recognises the hand held device and a hand shaking protocol 56, 58 may be entered between the SEC of the STB and the HSC on the hand held device to ensure that the HSC is authorised and the communications channel is secure.

Figure 5A:
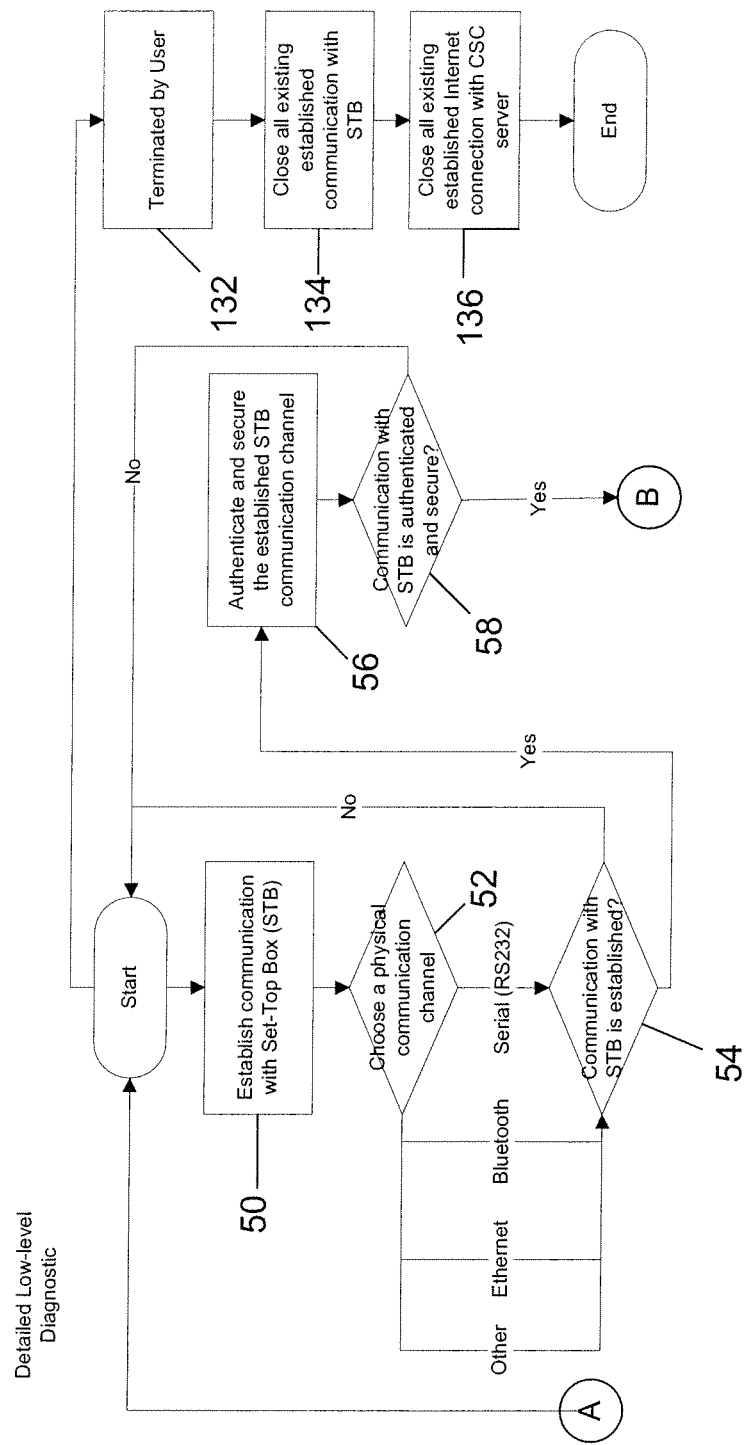
FIGS. 5A-C represent a process flow for a method for use in the system of FIG. 1.
Figure 5B:
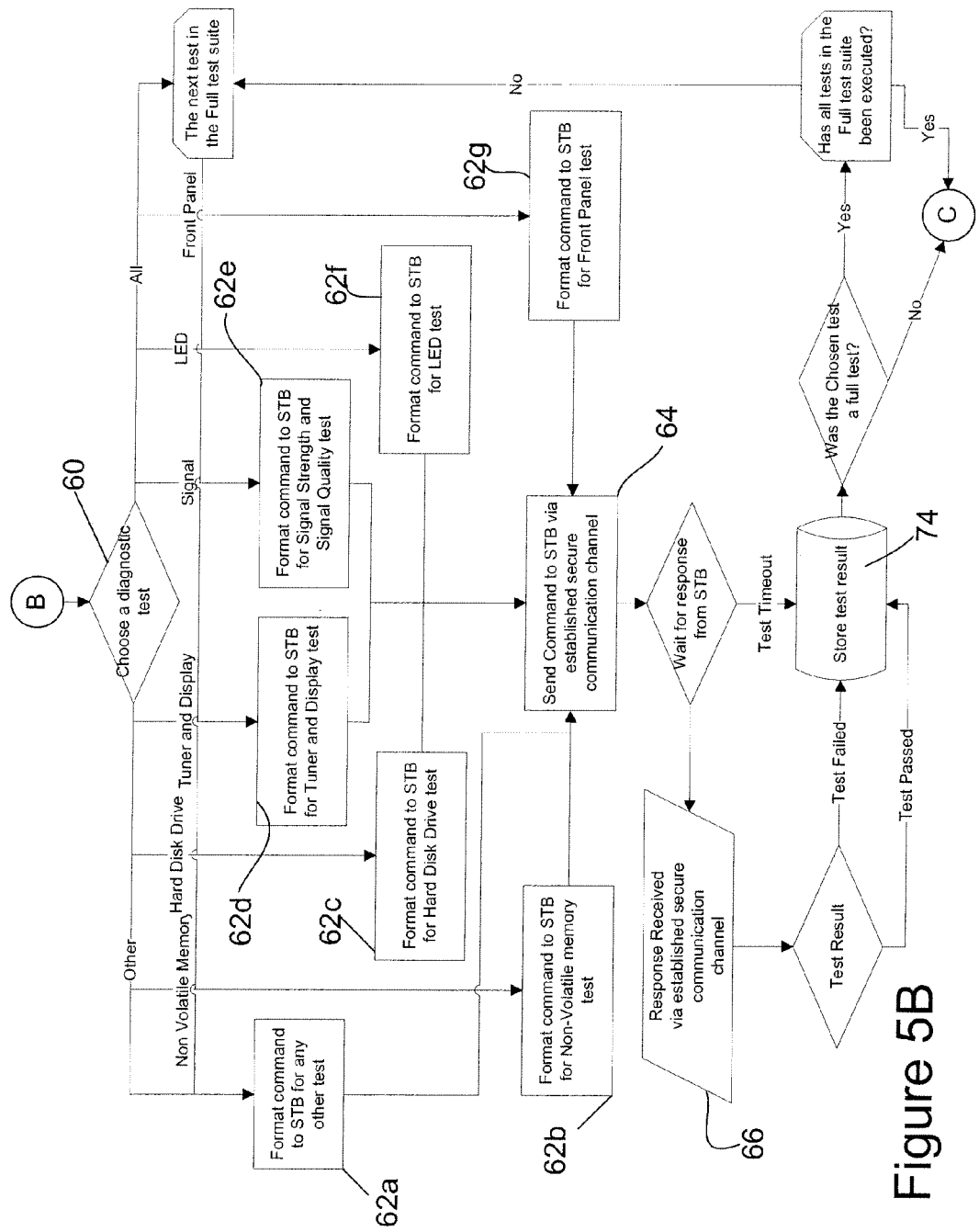

Once a connection has been established between the SEC and the HSC, the HSC may send one or instructions to the SEC. The SEC in turn in response to these instructions may provide the HSC with data. Thus the HSC and SEC may be configured that the field engineer may select 60 an appropriate option on his hand held device which causes the HSC to prepare 62*a-g* and then send 64 an instruction to the SEC of the STB to run for example a diagnostics routine, a series of diagnostic routines, or an individual test, as shown in FIG. 5B. At any stage, the user may terminate 132 the diagnostics, as shown in FIG. 5A, in which case all existing connections 134, 136 are closed. This may for example be employed where a test failure is identified during the process and the technician wants to investigate by checking the cabling, for instance.

An exemplary series of diagnostic routines may include for example but is not limited to the following tests:
Instructing the SEC component to tune to a range of signal bands that may be used in normal operation by the STB to receive TV. In satellite systems, for example, this would include individually tuning to the high and low frequency bands, and horizontal and vertical polarization signals. In cable STBs this may include tuning to signals at low and high ends of the carrier spectrum as well as some representative signals in the middle.

In the case of Internet Protocol Television (IPTV), the diagnostic routine may instruct the STB to perform a series of network tests on the connection. The diagnostic routine may instruct the STB to perform a series of network tests on the connection to test the network connection and provide one or more performance parameters including for example bandwidth, packet loss, latency and jitter.

Other tests may be appropriate to determine the state of a connection of an STB depending on the mode of connection used. For example, in the case of a cable connection a signal strength measurement may be performed.

validating that the SEC component successfully tuned to and locked to each of the tuned signals, and the signal parameters are within expected tolerance for signal strength, bit error rate, packet loss etc for each of the individual services, for the customer's geographic location. The customers geographic location may be retrieved by the hand held device from the CRM system of the operator or may be obtained from a location determining device such as a GPS.

In a satellite installation, a diagnosis may be performed to assist the field engineer identify possible mis-alignment issues related to the satellite dish by interpreting which of the signal carrier types are correctly received.

instructing the SEC to run a test to verify that any local storage devices, such as a hard disk drive, are working correctly. This test may for example comprise a simple write\read test to ensure that data is correctly being written and read from the storage device.

a similar test may be performed to verify that non-volatile electronic storage is working correctly on the STB by reading, over-writing, reading and confirming change, and resetting and re-reading some area in the NV storage area.

instructing the SEC to run a test to verify that all LEDs or other displays on the SEC are working correctly by turning on the LEDs\display elements in a particular sequence and requesting the field engineer to confirm their state.

instructing the SEC to run a test to verify the front panel buttons by instructing the field engineer on the display of the handheld device to press each particular named button in turn and confirming from the SEC that this button press was registered.

Figure 5C:
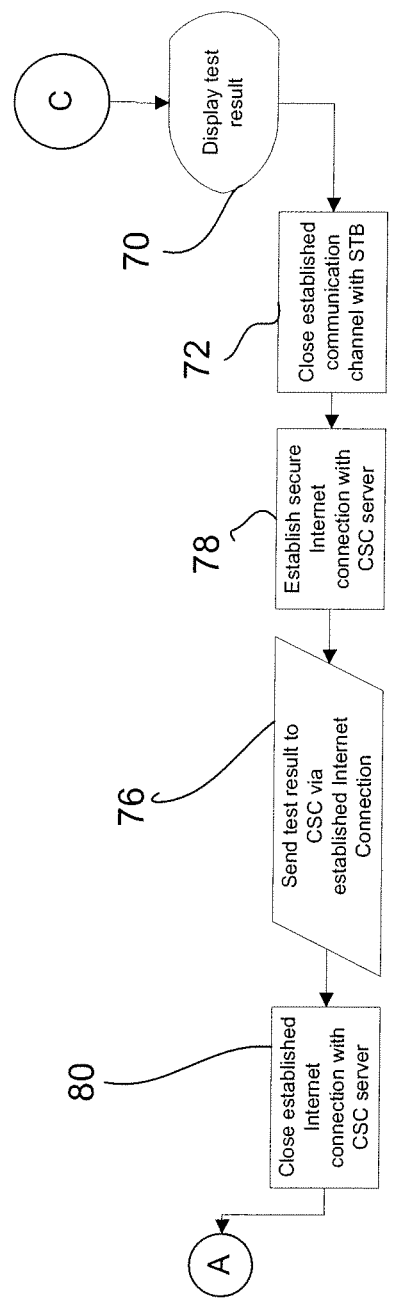

After a test routine has completed, the SEC may proceed with other tests until all required tests have been completed 68. The result of each test is stored. The HSC through the hand-held device may receive 66 a report indicating the outcome of the tests. This may be a simple pass\fail indication displayed 70 on the hand held device, as shown in FIG. 5C. Alternatively, more detailed analysis may be provided indicating the nature of the fail and for example suggesting possible solutions. The HSC of the hand held component may be configured to establish 78 a connection with the CRM system. Once a connection is established, the test results may be uploaded 76 and the connection closed 80. After completion of the tests, the communications channel between the SEC and HSC may be released 72.

This has several advantages over a manually verified installation as it allows for:

immediate determination of faults while the field engineer is still on the premises, including subtle faults (incorrect signal level) which indicate a problem which may only manifest itself later.

detailed error data is captured either on the HHD or STB that may aid with issue resolution and root cause analysis if the STB has to be returned for repair.

After the tests have been completed, the HSC may be configured to upload the data received back in the tests to the CSC or other data store. Similarly data could be received from such a store at the HSC or reviewed by a customer service representative when responding to a STB user's fault report. A comparison may be performed between the current results and a previous set of results, for example at installation, to determine whether performance has changed. Thus for example a change in signal strength might be indicative in a fault of the satellite dish or cabling.

Installer Use Case

Figure 6A:
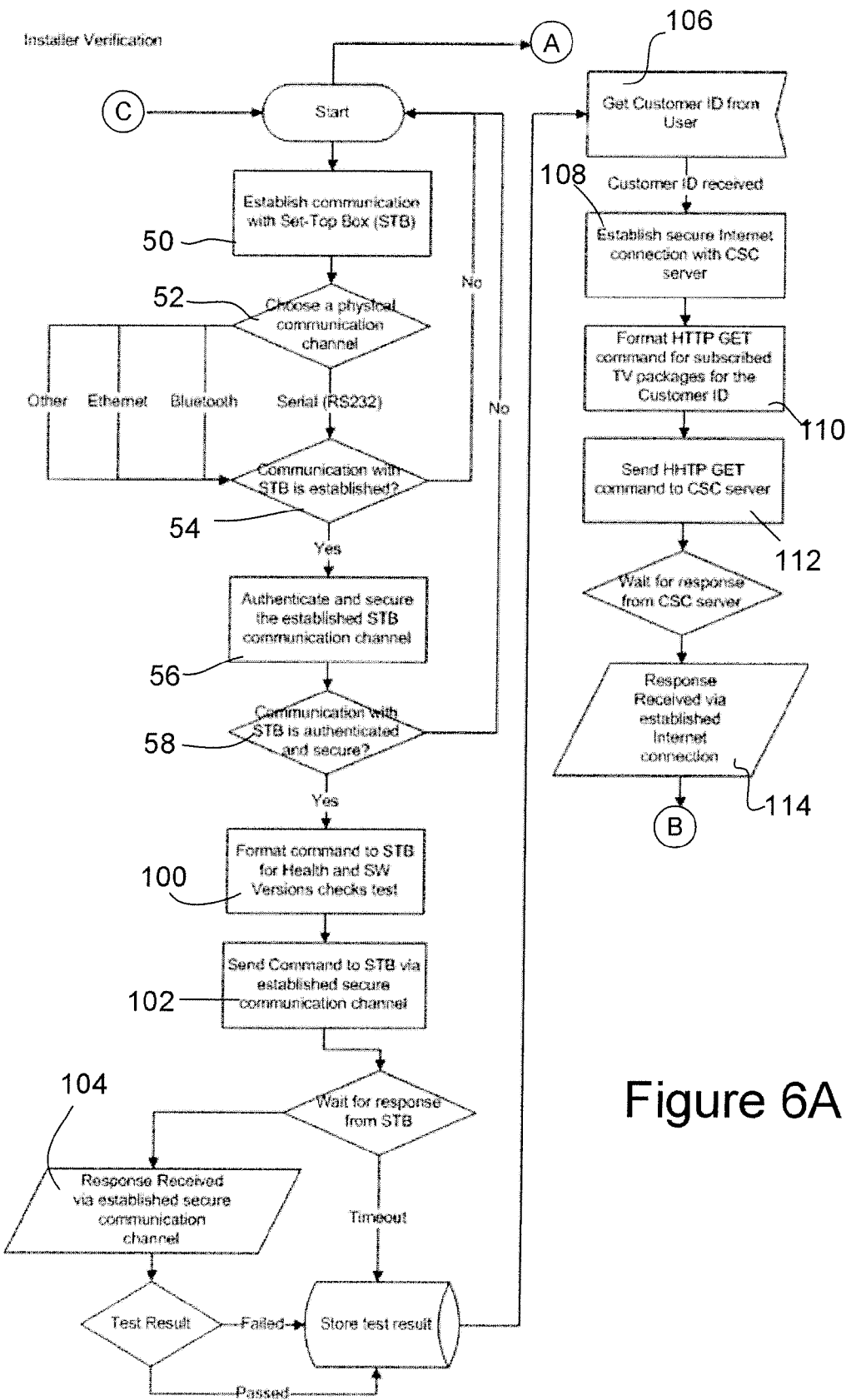
FIGS. 6A-B represent a process flow for a further method for use in the system of FIG. 1.
Figure 6B:
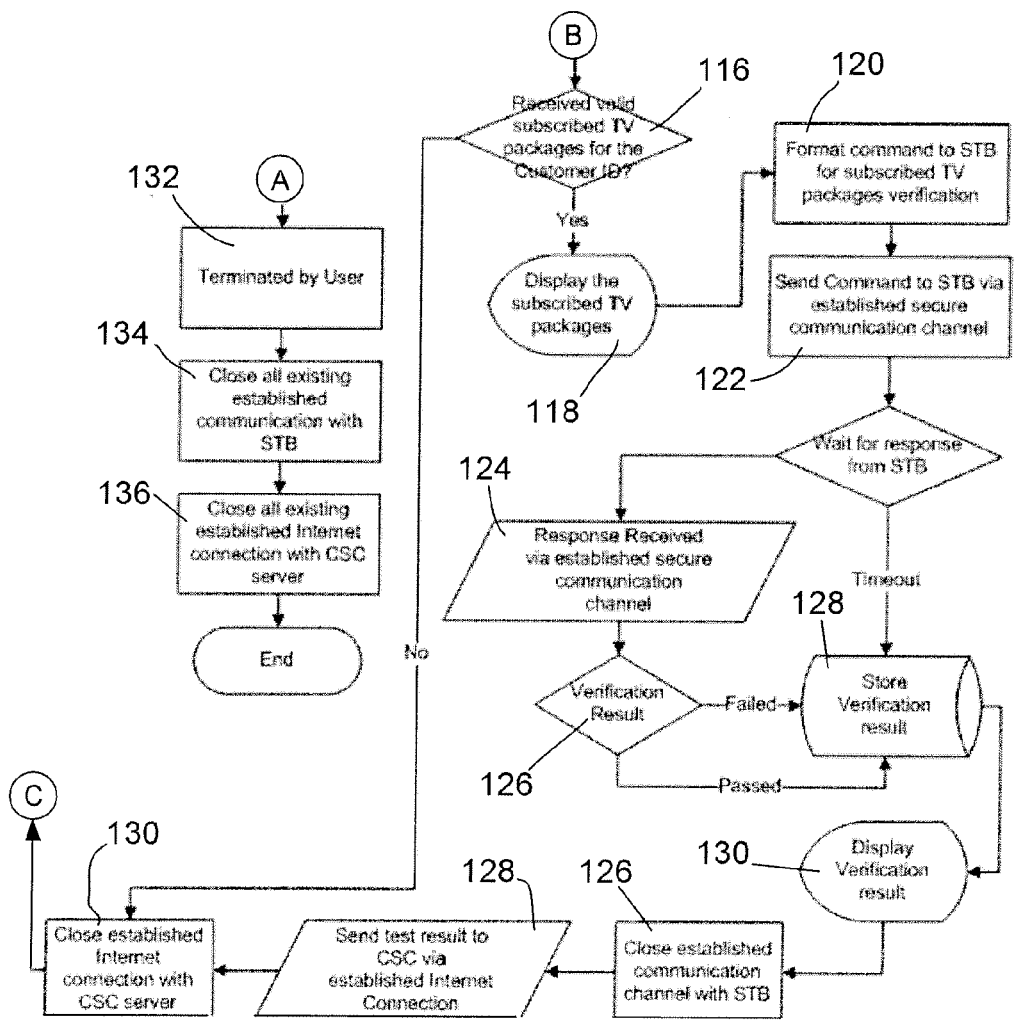

The use of the components may now be explained with reference to a possible use by an installer as shown in FIGS. 6A and 6B and which in the exemplary process shares several steps with FIGS. 5A-C and accordingly employs common reference numerals. In the case of installation, the tests performed are in addition to the normal diagnostic tests that might be employed to test whether a set top box is faulty. More specifically in the case of an installation, the tests are to confirm that the installation has been performed correctly and that the customer is receiving all of the services that they have ordered.

Typically an initial install for a new Customer is done by a representative of the network, such as a field engineer, who may visit the customer's house, complete any necessary cabling or satellite dish installation required for the delivery of television signals to the appropriate location in the customer's house, and install a new set-top box. The field engineer may generally carry a hand-held device which he may use to download his work assignments for the day, and record that he has completed them.

Typically Conditional Access (CA) systems are used to control access to the services provided by the network to the Customer. Networks generally segregate their set of services into different packages, which are sold separately. Each package contains several individual services, such as video or audio.

A customer may generally sign up for one or more packages from the set of packages provided by the network.

The field engineer doing the installation should normally ensure, before he leaves the customer's premises, that the customer's newly installed set-top box can correctly decode all the services which the customer has signed up for.

It has been observed in numerous networks that customers frequently report problems with their initial installations. These problems create a negative first impression for the new customer with the network's service, and are generally caused by problems such as:

Faulty new wiring installed by the field engineer

Incorrect CA rights enabled on the customer's STB

Incomplete or incorrect installation procedure carried out by the field engineer Defective STB installed The previously described components allow automatic validation of the correct completion of an installation by the installer.

In this configuration, the HSC is adapted to download from the network operator CRM system information with respect to the customer, for example the list of packages that should be installed on their STB following the completion of the work order associated with this particular installation (completion of the install). The HSC may also obtain information on the STB itself including for example what the latest version of software is that should be installed on the particular model of STB.

Once the field engineer has completed the physical installation procedure of the STB, he may activate via his hand-held device the HSC. Further steps in addition to the actual physical connection of the set top box and associated cabling, may be required during the physical installation, including for example providing customer privileges (CA rights) to the STB. These rights may be provided within a subscriber card which may be inserted into a corresponding reader on the STB, although other methods are employable as well including providing the user's rights as a digital certificate which
may be downloaded over the Internet or provided for on an external memory such a USB memory stick.

The HSC component establishes communication 50 with the STB Embedded Component (SEC) as previously described with respect to FIG. 5, and the HSC component prepares 100 one or more of a series of tests 100 which are communicated 102 to the STB to be performed, including for example but not limited to:

Obtaining the current software version currently present on the STB device from the SEC, comparing this with the expected latest software revision and if the software is not up to date, cause the triggering of a software upgrade on the STB before proceeding with the rest of the installation checking. This software upgrade may be effected directly by the HSC upon the STB or alternatively by the HSC providing an error message to the field engineer with an instruction to update to the latest firmware. These tests may be performed initially and the response stored and displayed to the user.

Determine the status of some basic STB functionality by using the SEC, for example Conditional Access smartcard status and tuner status. This may include obtaining 108-114 and translating the set of packages to which the customer should have access to into a list of individual services—for example, the HSC translates 120 this set of packages into a list of individual services, such as TV and Radio channels, which should be capable of being decoded once the installation has been properly completed. Using a determination either from the network CRM system or the HHID's internal\external GPS capabilities the geographic location of the installation may be determined. Once the location is determined, the expected tuning characteristics for this geographic location may be retrieved, either from the HSC or CSC, for the list of individual services obtained above. The HSC then instructs 122 the SEC component to tune to each of the individual services in turn and automatically validates that the SEC component successfully tuned to and can decode the Audio (for Radio services) or Audio and Video (for TV services) for each of the individual services. The automatic validation 124-128 may include confirming that the signal parameters were within expected tolerance for signal strength, bit error, packet loss etc for each of the individual services, for the customer's geographic location. It will be appreciated that in order for the HSC to perform the tests it may need first to obtain the customer ID 106.

After completion of the installation tests, the results are received 104. The HSC releases the communication channel between the SEC and HSC and reports 130 overall pass/fail for the installation to the field engineer via his hand-held device. A report of the status of the installation including details of the test results may then be provided to the network CRM system for storage and future reference in the event of a customer reporting a fault.

The system may also be employed to perform other tests, which may or may not be based on the user's permissions and/or configuration. Other tests may include performing a check to determine if video on demand, recording, playback and similar features are available and working. Similarly, streaming to other devices may be tested.

It will be appreciated that this automatic approach has several advantages over a manually verified installation, including for example:

Allows immediate determination of faults while the field engineer is still on the premises, including subtle faults (incorrect signal level) which indicate a problem which may only manifest itself later.

Allows automatic determination of successful installation.

Allows independent verification that an installation was completed correctly.

Reduces repeat visits by installers to remedy faulty initial installations.

Allows the network CRM system to track the progress of installations.

Subscriber Support Use Case

The use of the components may now be described with respect to a "Subscriber Support Use Case".

There is a significant cost to operators and inconvenience to their subscriber customers in the event that a field engineer needs to be dispatched to a subscriber's home or a STB has to be returned by a subscriber through some other channel. It is often discovered that the issue leading to the field-engineer call-out or STB return is a relatively straight-forward one which can be solved relatively easily by a suitably trained operative.

The first port of call for many subscribers when they experience problems is to contact the Operators customer support representative (CSR).

The previously described components (excluding the HSC) allows a customer service representative of the operator to run detailed diagnostics on the STB remotely in order to perform a complete assessment of the receiver hardware and where required make modifications to the STB remotely.

There may be issues related to initiating a subscriber support session. The first is that the STB may reside behind a firewall which would preclude it from being contacted directly. The second is an issue of privacy whereby subscribers are encouraged to volunteer remote access and control of their STB by taking some specific action. To address this, the set top box may be configured to respond to a user input for example a particular "magic key" combination on the remote control of their STB. Other user activation mechanisms may also be provided including a physical key on the STB. Once an activation is detected, the SEC within the STB is triggered causing the STB to establish a connection to the SEC Server thereby enabling the CSC backend to communicate with the STB. A CSC interface may be presented to the Customer Support Representative through a user interface which may typically be web based on a fixed PC workstation however may also be implemented on a mobile unit such as a mobile phone.

The primary purpose of each component will now be detailed.

SEC: The STB Embedded Component runs on each Set Top Box. It's role is to detect faults and gather data from the box, and implement diagnostic and repair related functionality. The SEC agent initiates connections with the SEC Server in order to report its status, and to allow the SEC Server to invoke functions implemented by the agent.

SEC Server: The SEC Server is responsible for gathering data from SEC Agents, and using this to maintain the information for each STB which is stored in the Database.

Database: The Database stores fault, status and statistical information for each STB managed by the server.

SEC Application Server: The SEC Application Server implements web applications which make use of the data stored in the Database to feed into the process of a variety of end users (e.g. allowing a customer support agent to view faults on an STB). Web applications may also allow end users to directly interact with individual STB's.

Browsers: Standard web browsers may be used to access web applications on the SEC Application Sewer. Once the CSC component established communication with the STB Embedded Component (SEC) it may retrieve information from the SEC and update a status record (SR) for the status of this STB.

This SR, which may be provided to the CSR through their use interface may include details on, for example:

Set top box identification.
HDMT Television Make and Model for connected, and previously connected Televisions.
CA Card (presence, serial number etc.)
Front-ends (signal strength etc.)
Peripherals
NVRAM
System resets
Hard disk temperature and other SMART data
Network configuration
Modem status
Power state
Timing of time spent in each power state in a given time period (and since last report)
Tuner statistics such as historical SNR, BER etc. since last status report
STB software configuration parameters
Temperature
STB software error log
Network statistics such as connection speed, round-trip-time, dropped packets, ping time etc since last status report
Current software version information (used to reconcile against known latest version of system software that is "on-air" and should be on the STB).

The CSC may be configured to enable a CSR through their interface to cause instructions to be sent to the STB to cause the SEC to:

refresh the SR and provide the updated SR to the CSC
Obtain a copy of the On-Screen Display (OSD) and provide this to the CSC to allow the CSR to view the OSD presented at the remote location where the STB is located
Issue remote control commands to the STB to cause changes in the STB state by sending them over the internet interface and having them processed by the SEC to simulate them having been received from the physical JR remote control unit.

The CSC browser application may present a number of different methods to the CSR to allow the sending of remote control commands. It may present in pictorial form a regular remote control with all of the buttons normally available to a normal user of the remote control. Each button may be selected by the user by 'clicking' on the button. It may also present a set of predefined actions which are the most typical operations which need to be performed during a service call. These often involve multiple keypresses on the remote control to get to the appropriate menu option but may be presented to the CSR as a single "shortcut". The CSC may store a copy of all remote control commands issued and OSD screens captured during the time of any single connection between the CSC and the SEC. The CSR may also be allowed to enter call session textual notes which may be synchronised with the most recent OSD screen retrieved from the STB.

To optimise the use of bandwidth between the CSC and the SEC, the SEC\CSC may be configured so that a new OSD screen grab image may only be sent from the SEC to the CSC after the final IR command has been processed on the SEC side. This implies that intermediate OSD states during the processing of a number of keypresses caused by a single shortcut may not be transmitted from the SEC to the CSC.

The CSC may use the network statistics retrieved from the STB to inform the SEC of the appropriate compression level to be used to encode OSD images prior to dispatch to the CSC. This setting can be varied on the fly by the CSR if required to observe certain fine grain detail in the event that the situation justifies a longer duration waiting for the OSD screen image to upload.

In another application, the SEC or indeed another application specific component may be used to provide an indirect measure of power consumption. In this method, the SEC may employ various timers to measure and report on the time that the STB spends in various power states. The timers are configured to measure an aggregate time that the STB is in a state rather than the duration that the STB is currently in the state. The power state may be for the entire STB (e.g. standby or active) and\or also for critical components within the STB such as the hard drive, individual tuners, AV outputs etc. The timing data when reported back to the CSC may be cross referenced against power consumption data taken for the same or a similar reference STB. In this way, time spent in various states may be converted into accurate power usage measurements. This data may be aggregated across all of the boxes in the operators network to arrive at very accurate figures for the overall power consumption of large numbers of Set Top Boxes. It will be appreciated that a significant advantage of this approach over alternative approaches to power measurement is that it does not require dedicated power measurement equipment to be integrated into each STB. It may be retro-fitted as part of a field upgrade to STB in the field today and into the future. It may be easily adapted to interface directly to any subsystem power efficiency technology present in the STB which may allow more discrete control over which components of the STB are powered-up at any point in time. Other advantages are that it does not require the end-user of the STB to do anything unlike most other measurement technologies and it does not add to the hardware bill of materials cost of the STB.

The measurement data may be uploaded periodically by the SEC to the CSC. The periodicity of this reporting may be algorithmically controlled to ensure that all STBs do not report at the same point in time in the event of a power failure which results in a large population of STBs powering up at the same time.

Having a set of all SR records for the entire population of STBs allows network operators to gain significant insight into the performance of their network.

It may be possible using this data to analyse which STBs are likely to display faults to the subscriber and pre-emptively take actions to avoid this including updating the firmware, contacting them via customer support and/or sending out a field engineer.

Figure 7:
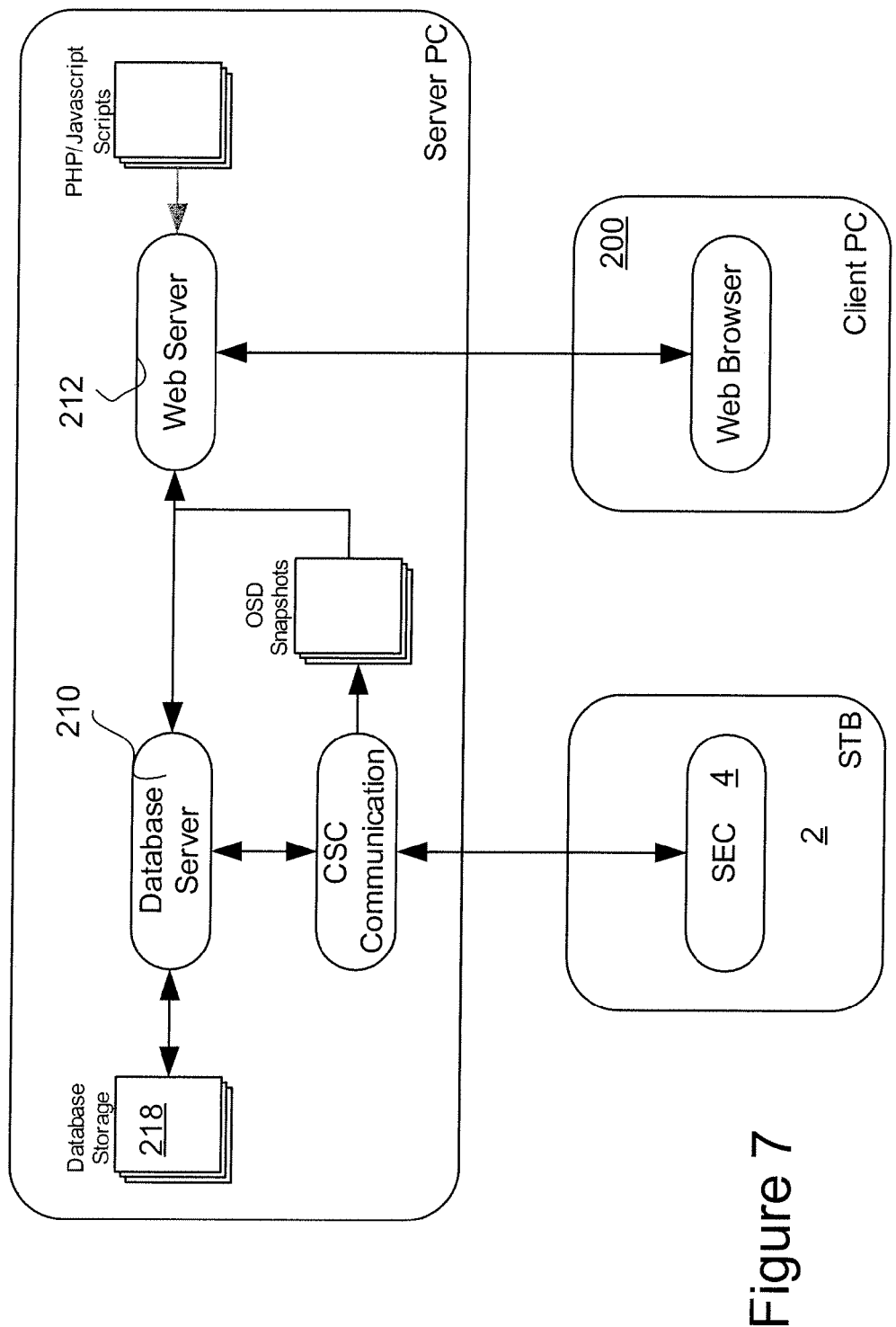
FIG. 7 illustrates specific components of the system of FIG. 1.

A typical CSC software architecture may be represented as shown in FIG. 7.

CSC—Communication Component

This is a software application which communicates with both the SEC and CSC UI Components using TCP/IP sockets.

The SEC communication channel is setup following a request from the SEC. Once the communication channel has been setup commands may be sent to the SEC, for example sending a keypress, requesting status or requesting an OSD snapshot.

OSD snapshots files received from the SEC are stored on the file system for later retrieval by the CSC UT Component.

STB status records received from the SEC are stored in the CSC Database Component.

The communication channel to the CSC UI Component is a request-response type interface.

CSC—Database Component

The CSC Database Component is a standard database application used to store STB status and other measurements retrieved from the STB(s) with which the CSC has communicated.

CSC—UI Component

The CSC UI Component is an application that the end-user interacts with allowing them to study the STB data stored in the database and to take control of an individual STB by sending key-press commands, requesting STB status updates and presenting OSD snapshots via the CSC Communication Component.

One possible implementation of the CSC UI Component uses a standard web application architecture consisting of a web server application, a set of server-side php scripts and a set of client-side Javascript scripts. The server-side component communicates with the CSC Database and SEC Communication Components and presents data to a client-side web browser via http. The web-browser then uses the client-side scripts to render the UI on the client computer.

In the foregoing specification, the application has been described with reference to specific examples of embodiments. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections. Thus as an example, whilst the present application has been described primarily with reference to situations where the diagnostic middleware responds to an external device, it will be appreciated that it may operate independently and respond to changes in state on the set top box, including for example a timer for periodic reporting, and upload the diagnostic results to an external computing system.

Because the apparatus implementing the present invention is, for the most part, composed of electronic components, circuits and devices known to those skilled in the art, circuit details will not be explained in any greater extent than that considered necessary as illustrated above, for the understanding and appreciation of the underlying concepts of the present application and in order not to obfuscate or distract from the teachings of the present application.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as 'associated with" each other such that the desired functionality is achieved, irrespective of architectures or intermedial components. Likewise, any two components so associated can also be viewed as being "operably connected," or 'operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense. For example, whilst the present application has been described with respect to a set top box, it will be appreciated that the functionality may be integrated within another device. Accordingly, the present application extends beyond application to set top boxes and accordingly wherever a reference is made herein to set top box, it should be taken to extend to and include any 'multimedia device, which is operable to receive an incoming digital television signal and cause it to be displayed on a display which may be integrated to or connected with the 'multimedia device'. This connection may be a physical one, for example a SCART, HDMI, S-Video or similar cable connection or a wireless connection such as Bluetooth or Wi-Fi. Accordingly, it will be appreciated that the present application is applicable not just to set top boxes but to other multimedia devices including for example integrated digital televisions, portable computing devices and mobile phones. Similarly, it will be appreciated that whilst the present application has been described with reference to an exemplary situation in which a television is selected as the display device, it will be appreciated that the application in not so limited and alternative displays may be employed. For example, a computer monitor may be employed as a display device. Similarly, the display device may be a computing device with a integrated display. The computing device may be portable for example a laptop or tablet computer. In this arrangement, the set top box may stream the decoded television content to the computing device over a local wireless connection.

References to an "Installer" and "Field Engineer" are used interchangeably herein and the usage will depend on the function being carried out by the Field Engineer. Thus, in one embodiment, when a field engineer is installing a STB, he will be an installer but when he is repairing a STB, he is not.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be constructed to imply that the introduction of another claim element by the indefinite articles "a" or 'an' limits any particular claim containing such introduced claim element to inventions containing only one such element, even when the same claim includes the introductory phrases "one or more' or 'at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system for use by an installer in installing a set top box at a customer location, comprising:
    a remote control device to transmit commands;
    a hand held computing device configured to download configuration information for a customer location from a server and configured to receive input from an installer at the customer location; and
    a set top box, comprising:
        a remote control interface for receiving the commands from the remote control device;
        a local communications channel for receiving instructions and transmitting data to the hand held computing device when the installer is installing the set top box at the customer location;
        an emulator for emulating the receipt of at least one of the commands at the remote control interface by injecting one or more remote control keypresses directly into the remote control interface in response to the receipt of one of the instructions from the hand held computing device to issue the at least one command; and
        a diagnostic feature comprised in the set top box and activatable over the local communications channel by the hand held computing device after the hand held computing device receives the input from the installer to perform one or more verification tests that the set top box has been installed in the customer location in accordance with the configuration information and to return results of the one or more verification tests to the hand held computing device to confirm to the installer that the set top box has been installed correctly prior to the installer leaving the customer location.

2. A system according to claim 1, wherein the control interface comprises an infra red detector.

3. A system according to claim 1, wherein the set top box further comprises:
    a remote communications circuit for receiving instructions from a remote user over a remote communications channel and wherein the emulator is configured to be responsive to the receipt of instructions from the remote user to inject one or more remote control keypresses;
    a video circuit to receive media content and to format the media content into a video component of a TV signal; and
    a storage device having stored thereon an image capturing block for capturing one or more images of the video component and transmitting the one or more images to the remote user through the remote communications circuit.

4. A system according to claim 3, wherein the image capturing block is configured to compress the one or more images into in a compressed format.

5. A system according to claim 4, wherein the one or more images are compressed based on a measure associated with the local communications channel.

6. A system according to claim 3, wherein the video circuit is adapted to retrieve information from an On Screen Display memory device, and provide the information within the video component.

7. A method of installing a set top box at a customer location using a hand held computing device, comprising:
    coupling the hand held computing device to the set top box at the customer location, the set top box including a remote control interface configured to receive one or more commands sent by a remote control having a keypad for receiving keypresses and a transmitter for transmitting the one or more commands to the set top box, an emulator configured to emulate the receipt of at least one command of the one or more commands at the remote control interface by injecting one or more remote control keypresses directly into the remote control interface in response to receiving one or more instructions from the hand held computing device to issue the at least one command, a video circuit configured to receive media content and format the media content into a video component of a TV signal, and a communications module configured to communicate with the hand held device over a local communications channel;
    receiving, from the hand held computing device, an instruction to download configuration information for the customer location from a server;
    upon receiving the instruction, downloading, from the server, the configuration information for the customer location;
    performing one or more verification tests by emulating the receipt of the at least one command at the remote control interface; and
    based on the performance of the one or more verification tests, transmitting one or more results of the verification tests to the hand held computing device over the local communication channel to confirm that the set top box has been installed in the customer location in accordance with the downloaded configuration information prior to an installer leaving the customer location.

8. A method according to claim 7, further comprising:
    capturing an image associated with the video circuit; and
    transmitting, over the local communication channel, the captured image to the hand held computing device.

9. A set top box comprising:
a remote control interface configured to receive commands from a remote control device;
a communications circuit configured to receive instructions and transmit data to a hand held computing device over a local communications channel when an installer is installing the set top box at a customer location, the hand held computing device configured to download configuration information for the customer location from a server, and receive input from the installer at the customer location;
an emulator configured to emulate the receipt of at least one of the commands at the remote control interface by injecting one or more remote control keypresses directly into the remote control interface in response to the receipt of one of the instructions from the hand held computing device to issue the at least one command; and
a diagnostic feature configured to be activated over the local communications channel by the hand held computing device after the hand held computing device receives the input from the installer to perform one or more verification tests that the set top box has been installed in the customer location in accordance with the configuration information, and to return results of the one or more verification tests to the hand held computing device to confirm to the installer that the set top box has been installed correctly prior to the installer leaving the customer location.

10. A set top box according to claim 9, further comprising:
a video circuit configured to receive media content and format the received media content into a video component of a TV signal; and
a storage device having stored thereon an image capturing block configured to capture at least one image from the video circuit and transmit the captured at least one image to the hand held computing device.

11. A set top box according to claim 10, wherein the image capturing block is configured to compress the at least one image into in a compressed format.

12. A set top box according to claim 11, wherein the communications circuit is configured to obtain a measure associated with the local communications channel, the at least one image being compressed based on the obtained measure.

13. A set top box according to claim 10, wherein the video circuit is adapted to retrieve information from an On Screen Display memory device, and provide the information within the video component.

14. A set top box according to claim 9, wherein the control interface comprises an infra red detector.

* * * * *